F. J. SCHRANK.
METHOD AND APPARATUS FOR MAKING TIRES.
APPLICATION FILED FEB. 18, 1921. RENEWED SEPT. 15, 1921.
1,411,672.
Patented Apr. 4, 1922.
2 SHEETS—SHEET 1.
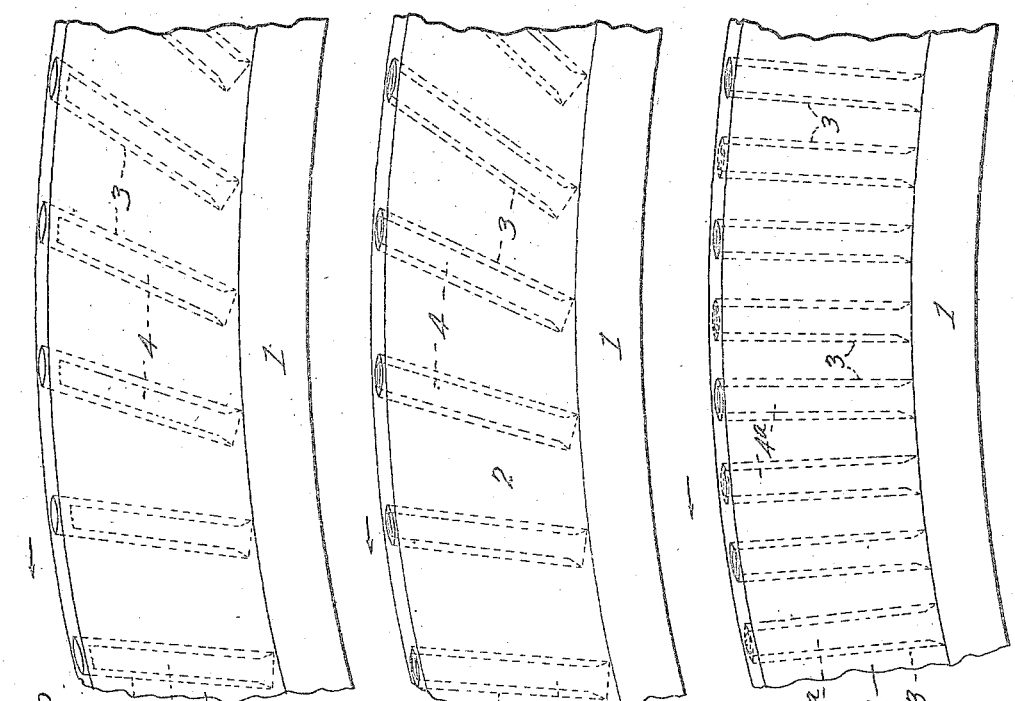
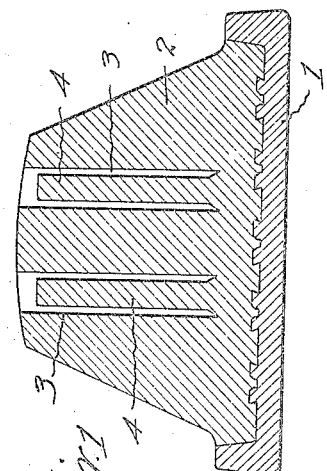
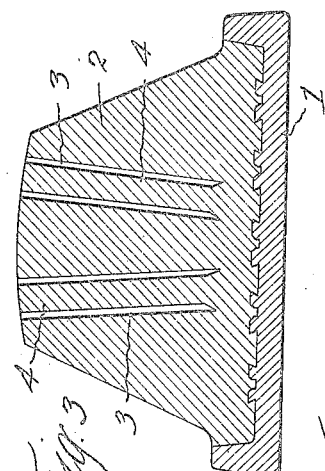
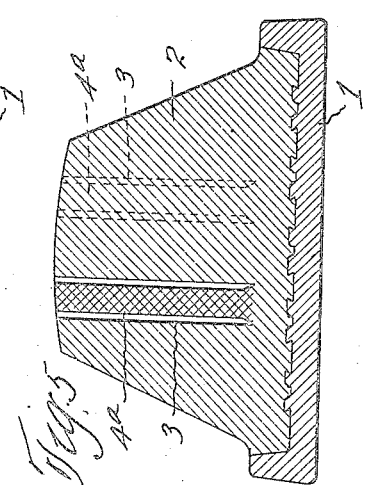
Inventor
Fred J. Schrank
By Harold Elmo Smith
Atty.

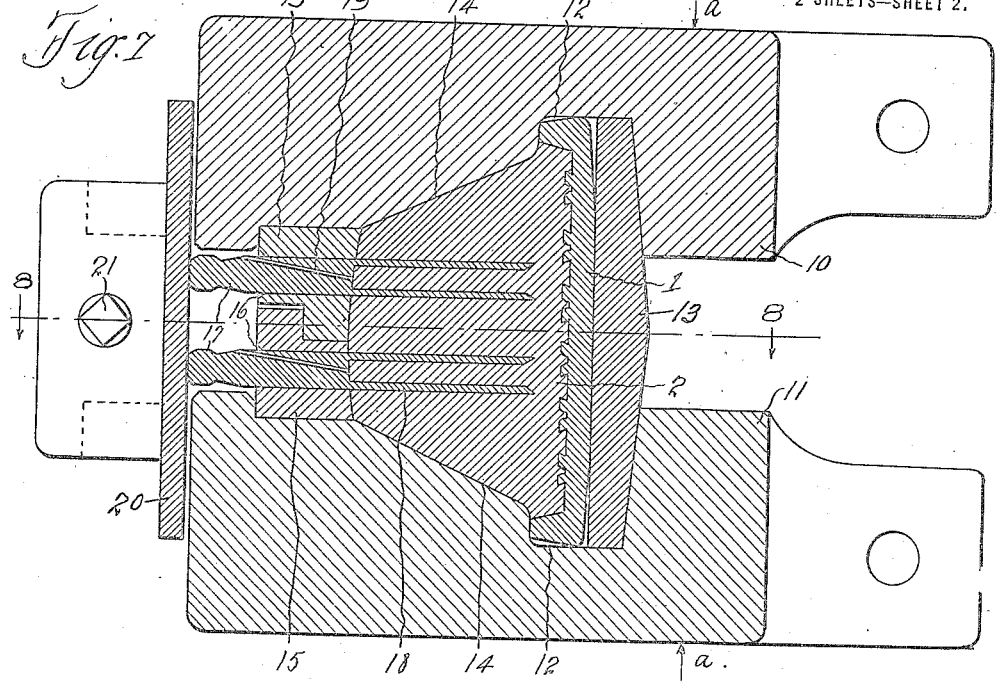
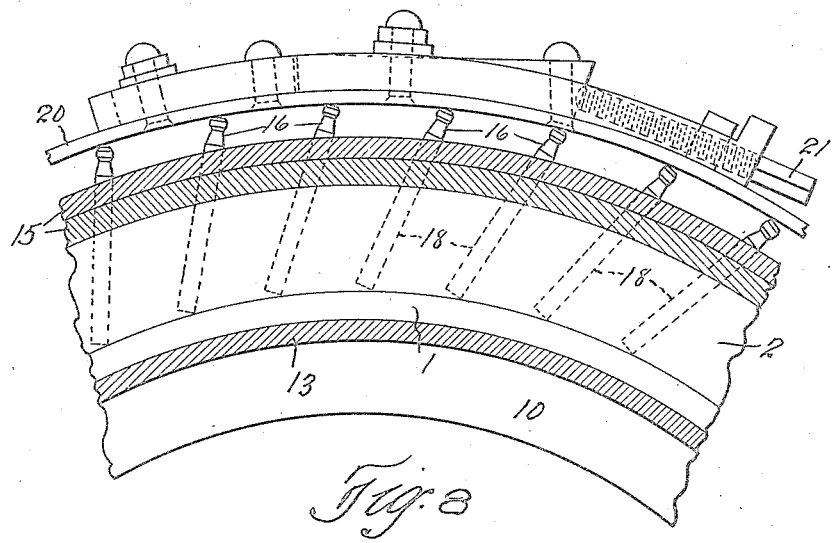

UNITED STATES PATENT OFFICE.

FRED J. SCHRANK, OF AKRON, OHIO, ASSIGNOR TO THE SWINEHART TIRE & RUBBER COMPANY, OF AKRON, OHIO, A CORPORATION OF OHIO.

METHOD AND APPARATUS FOR MAKING TIRES.

1,411,672.      Specification of Letters Patent.    Patented Apr. 4, 1922.

Original application filed December 31, 1920, Serial No. 434,230. Divided and this application filed February 18, 1921, Serial No. 446,084. Renewed September 15, 1921. Serial No. 500,967.

*To all whom it may concern:*

Be it known that I, FRED J. SCHRANK, a citizen of the United States, residing at Akron, in the county of Summit and State of Ohio, have invented new and useful Improvements in the Method and Apparatus for Making Tires, of which the following is a specification, reference being had to the accompanying drawing.

This invention relates to vehicle tires and especially to those of the cushion type as employed particularly on self-propelled trucks, although not restricted thereto. Such tires are made of some elastic cushioning material, as exemplified by a rubber composition, and my invention has for its objects the provision of a structure which shall possess an enhanced cushioning effect, which shall stand extreme overloads and other hard usage with a minimum of injury, and as a result shall afford unusually long wear. Other objects of the invention are the provision of a cellular tire having means for impeding the entrance of sand and foreign matter into the cells and for decreasing the weakening effect of those cells; the provision of new and improved apparatus and methods for producing such a tire; while further objects and advantages of the invention will appear as the description proceeds.

In the drawings accompanying and forming a part of this application, I have shown certain illustrative embodiments of my invention although without intent to limit myself thereto, since the same can be embodied in numerous other specific forms. Fig. 1 represents a cross sectional view and Fig. 2 a partial elevation of a tire embodying my improvements; Figs. 3 and 4 are similar views of a modified construction; Figs. 5 and 6 are similar views of another modified construction; Fig. 7 is a cross sectional view of the mold and associated parts preferably employed in making my improved tire; and Fig. 8 is a sectional view on the line 8—8 of Fig. 7.

Broadly speaking, my invention consists in molding in the tread portions of a solid elastic tire, a plurality of openings extending from the tread portion thereof inwardly toward the base of the tire, each opening having an elastic or flexible core which projects nearly or quite to the tire surface. These cores are preferably (but not necessarily) of the same material as the tire, and preferably extend to a point rather near the base thereof, and may be either staggered or abreast, radial or inclined, parallel or flaring, small or large, deep or shallow.

Describing by reference characters the parts shown in the drawings, 1 represents the flanged rim or tire base, and 2 represents the elastic cushioning material mounted thereon and constituting the tire. Neither the shape of the rim nor the shape, design or mode of attachment of the tire is important to the present invention. 3—3 represent annular recesses which extend from the tread portion of the tire into the substance thereof the desired distance, and 4—4 represent the cores located therein. In Figs. 1 and 2 the cores are integral with the tire substance and slightly shorter than the recesses so as to terminate a short distance inside the tread. The recesses are also arranged at an angle to the radius, but parallel to the plane of the wheel. In Figs. 3 and 4 the cores are also integral with the tire substance, and inclined to the radius, but are also inclined to the plane of the wheel and project flush with the surface of the tread. In Figs. 5 and 6 the cores are made of a separate flexible substance, adhesively united at their inner ends to the tire material, and arranged parallel to the radii and to the plane of the wheel. The above named variations and arrangements and substances can be varied indefinitely, as can also the relative sizes of core and opening, although in most cases a small clearance is left between the core and opening in order to afford traction and to afford an alternate inspiration and expiration of air during the revolution of the tire so that the interior parts are kept cool.

When the apertures are inclined as illustrated in Figs. 2 and 4, the wheel is preferably rotated in the direction shown in the arrows, which causes a progressive closing of the recesses as they approach the ground or working portions of the tire, thereby minimizing the entrance of dirt. The recesses also have a tendency to decrease slipping and skidding, particularly in case the cores be somewhat shorter than the holes, and in practice these cores tend to wear away slightly faster than the tread itself, thereby maintaining this condition, although by making them of the proper substance this can be overcome.

The preferred process and apparatus for producing this tire is shown in Figs. 7 and 8, in which 10 and 11 represent the upper and lower mating halves of a tire mold whose adjacent faces are formed with the grooves 12—12 for the rim or tire base, and also preferably for the base rings 13, and with inclined portions 14—14 for the sides of the tire. Around the tread portion of the tire there are located the interfitting pin-positioning rings 15—15, each of which is formed with suitable apertures 16 for the reception of the cell pins 17—17 which are driven into the tire material in any suitable manner after the various parts have been positioned in the mold as above described but prior to the placing of pressure thereon. The inner end of each pin is hollow as shown at 18, such cavity extending as far out as it is desired that the core should project and being vented by the ducts 19. After the pins have been forced into place they are surrounded by the retaining ring 20 which is clamped tightly in any suitable manner as by the clamp screw 21. Pressure is then applied to the mold in the direction indicated by the arrow $a$—$a$ in any suitable manner such as a hydraulic press, whereby the cushioning material is forced thoroughly into the pins and into contact with all parts of the mold space, and the tire is then cured by heat while under such pressure, after which the pins are withdrawn and the mold sections separated. The pins and mold parts are suitably treated to prevent the material from adhering thereto as will be well understood by those skilled in the art. In case the cores are to be made of a material separate from or different than that of the tire body, the inner end of each pin is first filled with such core substance, which becomes firmly united to the tire substance during the compressing and curing operation.

The shape, size, depth, and arrangement of these recesses and cores is entirely within the selection of the tire maker. As a satisfactory example, but without intent to limit myself thereto, I will instance the following dimensions: exterior diameter of tire—34 inches; thickness of tire—4 inches; width at base—6 inches; width at tread—3 inches; diameter of hole—$\frac{3}{16}$ inch; depth of hole—$3\frac{1}{4}$ inches; diameter of core—$\frac{7}{16}$ inch; inclination of hole—12° from radius.

It will be understood that I do not confine myself to this particular type of tire or to this particular process of manufacture or to any of the dimensions, details, designs, or arrangements herein set forth except as the same are specifically recited in my claims.

Having thus described my invention, what I claim is:

1. Apparatus for tire manufacture comprising, in combination, a ring adapted to surround the tire tread and having a plurality of apertures therein, a plurality of cellular pins adapted to be inserted through said apertures into the body of the tire material, and mold members adapted to overlap said ring and the inner portion of the tire and to engage the sides thereof.

2. Apparatus for tire manufacture comprising, in combination, a pair of interfitting rings adapted to surround the tire tread and each having a plurality of apertures therein, a plurality of cylindrical pins adapted to be inserted through said apertures into the body of the tire, mold members adapted to engage said rings and the sides of the tire, and a retaining ring adapted to surround said pins.

3. Apparatus for tire manufacture comprising, in combination, a ring adapted to surround the tire tread and having therein a plurality of apertures regularly arranged, a plurality of cylindrical pins adapted to be inserted through said apertures into the body of the tire, each of said pins having its inner end hollow, and having a vent extending outwardly from the base of such hollow portion, and a pair of mold members adapted to engage said ring and the side of the tire, said ring and mold members having telescoping interengagement whereby pressure can be exerted upon the tire composition.

4. Apparatus for tire manufacture comprising, in combination, a pair of interfitting rings adapted to surround the tire tread and having therein a plurality of apertures, a plurality of cylindrical pins adapted to be inserted through said apertures into the body of the tire, each of said pins having its inner end hollow, mold members adapted to engage the parts of the tire other than the tread, and a retaining ring adapted to surround said pins.

5. Apparatus for tire manufacture comprising, in combination, a pair of mold members having mating grooves in their adjacent faces, inner and outer rings adapted to project into said grooves and defining thereabout a cavity the shape of a tire, the outer ring having therein a plurality of apertures which communicate with such cavity, pins adapted to be inserted into the said apertures and to project into such cavity, the heads of such pins occupying the space between the adjacent faces of the mold members, and means for retaining said pins against accidental displacement.

6. The process of making tires which includes the steps of enclosing tire material in an annular space, sticking hollow pins into such space, exerting pressure laterally upon the tire materal to force the same into the hollows of the pins, curing the tires by heat while subjected to such pressure, removing such pressure, and removing the pins.

In testimony whereof, I hereunto affix my signature.

FRED J. SCHRANK.